United States Patent [19]
Wautier et al.

[11] Patent Number: 6,013,710
[45] Date of Patent: Jan. 11, 2000

[54] PROCESS FOR THE STORAGE STABILIZATION OF POLY-ε-CAPROLACTONES

[75] Inventors: Henri Wautier, Braine-le-Comte; Martine Kaszacs, Braine l'Alleud, both of Belgium

[73] Assignee: Solvay (Société Anonyme), Brussels, Belgium

[21] Appl. No.: 08/928,624

[22] Filed: Sep. 12, 1997

[30] Foreign Application Priority Data

Sep. 13, 1996 [BE] Belgium ............................... 09600767

[51] Int. Cl.[7] ...................................... C08K 5/24
[52] U.S. Cl. ......................... 524/265; 524/492; 524/493; 524/599
[58] Field of Search ..................... 524/265, 493, 524/494, 492, 599; 528/357, 359

[56] References Cited

U.S. PATENT DOCUMENTS

| | | | |
|---|---|---|---|
| 3,259,607 | 7/1966 | Cherdron et al. | 528/359 |
| 3,475,371 | 10/1969 | Stewart et al. | |
| 3,652,484 | 3/1972 | Weissermel et al. | 524/265 |
| 3,844,987 | 10/1974 | Clendinning et al. | 523/125 |
| 4,089,838 | 5/1978 | Hornbaker et al. | |
| 4,116,922 | 9/1978 | Hornbaker et al. | 524/265 |
| 4,569,973 | 2/1986 | Tyrell et al. | 524/605 |
| 4,670,498 | 6/1987 | Furusawa et al. | 524/605 |
| 4,994,518 | 2/1991 | Morin et al. | 524/599 |
| 5,238,928 | 8/1993 | Stein | 524/394 |
| 5,378,531 | 1/1995 | Larson et al. | 528/359 |
| 5,468,837 | 11/1995 | Wautier | 528/357 |
| 5,656,718 | 8/1997 | Wautier et al. | 528/357 |

FOREIGN PATENT DOCUMENTS

| | | |
|---|---|---|
| 1092764 | 11/1967 | United Kingdom. |
| 0 019 212 | 11/1980 | United Kingdom. |

OTHER PUBLICATIONS

"Poly(lactones), 9, Polymerization mechanism of Metal Alkoxide Initiated Polymerizations of Lactide and Various Lactones"; Hans R. Kricheldorf, et al., *Macromolecules* 1988, 21, 286–293.

"Mechanism of ε–Caprolactone Polymerization by Aluminum Alkoxides"; Trazollah Ouhadi, et al., *Die Makromolekulare Chemie, Suppl*, 1, 191–201 (1975).

*Primary Examiner*—Veronica P. Hoke
*Attorney, Agent, or Firm*—Oblon, Spivak, McClelland, Maier & Neustadt, P.C.

[57] ABSTRACT

Poly-ε-caprolactones produced by continuous melt polymerization of ε-caprolactone with the use of aluminium alkoxides are stabilized for storage by incorporation of an effective quantity of silicon derivative such as, for example, a silicon oxide, an inorganic silicate or a silicon alkoxide, preference being given to silicon alkoxides. This process has the effect of greatly limiting the gradual reduction in the inherent viscosity of the poly-ε-caprolactones in the course of time. In accordance with a preferred embodiment the incorporation of the silicon derivative is preceded by the incorporation of an effective quantity of water, and this further improves the storage stability of the poly-ε-caprolactones produced with the use of aluminium alkoxides.

14 Claims, No Drawings

PROCESS FOR THE STORAGE STABILIZATION OF POLY-ε-CAPROLACTONES

The present invention relates to a process for the storage stabilization of poly-ε-caprolactones. It relates more particularly to a process for the storage stabilization of the poly-ε-caprolactones produced with the use of aluminium alkoxides as polymerization initiators (referred to briefly as "initiators" hereinafter).

It is known to produce poly-ε-caprolactones by polymerization of ε-caprolactone, alone or mixed with other lactones, with the use of aluminium alkoxides as initiators. The latter are initiators that are particularly active and permit the customized manufacture of poly-ε-caprolactones of variable molecular masses by an adjustment of the molar ratio of aluminium alkoxide/-ε-caprolactone used in the polymerization. Aluminium alkoxides are particularly suitable for initiating the continuous polymerization of ε-caprolactone melt in an extruder (also called reactive extrusion polymerization) with a view to producing poly-ε-caprolactones of high molecular masses which can be employed especially for manufacturing, finished and semi-finished articles by melt forming. The reactive extrusion of ε-caprolactone with the use of aluminium alkoxides is described in Patent Application EP A-626 405 in the name of SOLVAY.

Nevertheless the use of aluminium alkoxides as initiators for the polymerization of ε-caprolactone presents the disadvantage of producing poly-ε-caprolactones whose storage stability leaves something to be desired. This storage instability, generally attributed to a hydrolysis of poly-ε-caprolactone, is in practice reflected in a gradual reduction in the inherent viscosity of poly-ε-caprolactones in the course of time.

It has already been proposed to improve the storage stability of poly-ε-caprolactones produced by polymerization of ε-caprolactone in solution in toluene with the use of alundnium alkoxides by successively performing repeated extractions of the catalyst residues by means of a dilute aqueous solution of hydrochloric acid, neutralization of the solution of poly-ε-caprolactone in toluene by washing, with water and, lastly, precipitation of the poly-ε-caprolactone in heptane (T. Ouhadi, Ch. Stevens and Ph. Teyssié, Die Makromolekulare Chemie, Suppl. 1, 191–201 (1975). Although this type of treatment effectively improves the storage stability of poly-ε-caprolactones produced with the use of aluminium alkoxides, it does not appear to be applicable on an industrial scale. In addition, the results which it produces can be improved further.

The objective of the present invention is to provide a process for storage stabilization of poly-ε-caprolactones produced by reactive extrusion of ε-caprolactone with the use of aluminium alkoxides which does not exhibit the abovementioned disadvantages, while being very effective and easy to apply industrially.

To this end the invention relates to a process for storage stabilization of poly-ε-caprolactones produced by continuous polymerization of ε-caprolactone melt in an extruder with the use of aluminium alkoxides as polymerization initiators, characterized in that an effective quantity of stabilizer derived from silicon is incorporated into the poly-ε-caprolactone.

For the purpose of the present invention melt polymerization is intended to denote polymerization in the substantial absence of solvent or diluent and at a temperature which is at least equal to the melting temperature of the poly-ε-caprolactones produced.

An extruder is intended to denote any continuous device including a feed zone and a discharge zone, through which the molten material is forced to pass with mean residence times not exceeding 15 minutes. Known extruders based on the work of two screws, regardless of whether they rotate in the same or opposite direction, will be advantageously used.

Poly-ε-caprolactones are intended to denote both the homopolymers of ε-caprolactone and the copolymers with other lactones such as β-propiolactone or δ-valerolactone, with a preponderant content of ε-caprolactone. The stabilization process according to the present invention is particularly suited for the stabilization of homopolymer poly-ε-caprolactones produced by reactive extrusion of ε-caprolactone with the use of aluminium alkoxides.

Finally, for the purpose of the present invention aluminium alkoxide is intended to denote the organoaluminium compounds containing at least one aluminoxane-carbon bond (>Al—O—C—) and the mixtures of such compounds. In most cases the aluminium alkoxide will contain three aluminoxane bonds. The aluminium alkoxide will advantageously be chosen from aluminium trialkoxides in which the identical or different alkyl radicals contain from 2 to 6 carbon atoms (such as, for example, aluminium tributoxide) or else from aluminium trialkoxides in which at least one alkoxy radical contains, besides the oxygen atom forming part of the aluminoxane bond (>Al—O), at least one other oxygen atom present in the form of an ester functional group (such as, for example, the ε-caprolactone oligomers produced by polymerization of 1 to 12 moles of ε-caprolactone in the presence of one mole of aluminium trialkoxide) or else another oxygen atom present in the form of an ether functional group (such as, for example, aluminium trialkoxyalkoxides like tri(methoxyethoxy)aluminium). The aluminium trialkoxides in which at least one of the alkoxy radicals contains, besides the aluminoxane bond, an ether or ester functional group are generally in the liquid state at ambient temperature and can consequently be used without solvent. The aluminium alkoxides are used advantageously in the presence of an alcohol acting as chain transfer agent, in a quantity which generally does not exceed 3 moles of alcohol per mole of aluminium alkoxide, and this makes it possible to reduce the quantities of aluminium alkoxides necessary for producing poly-ε-caprolactones of preestablished molecular mass and consequently reduces the catalyst residues in the poly-ε-caprolactones produced.

The present invention is based on the surprising finding that the incorporation of an appropriate quantity of chosen silicon derivatives contributes effectively to improving the storage stability of the poly-ε-caprolactones produced by reactive extrusion of ε-caprolactone with the use of aluminium alkoxides as defined above.

By way of nonlimiting examples of silicon derivatives that can be employed as stabilizers within the scope of the process of the invention it is possible to mention silicon oxides such as silicas, which are coated or uncoated and which may optionally contain water of hydration, inorganic silicates (metal silicates) and silicon alkoxides. The best results are obtained with silicon alkoxides. Alkoxides which are particularly preferred are silicon tetraalkoxides in which the identical or different alkyl radicals contain from 1 to 8 carbon atoms and, more particularly still, those in which the four alkyl radicals are identical and contain from 1 to 4 carbon atoms. Excellent results are obtained with silicon tetraethoxide of formula:

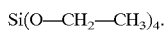

In practice the improvement in the storage stability of poly-ε-caprolactones can be measured using the ratio of the melt indices (MFIs) of the poly-ε-caprolactone before and after storage in specified conditions of durations and temperatures.

MFI is intended hereinafter to mean the melt index measured according to ASTM Standard D 1238 (160° C., 2.16 kg, 8/2 die). $MFI_{init.}$ is intended hereinafter to mean the MFI (as defined above) of the unaged poly-ε-caprolactone, and $MFI_{stor.}$ the MFI (as defined above) of the poly-ε-caprolactone after storage for 15 hours in a ventilated oven at 180° C.

An effective quantity of the silicon derivative is intended to mean a quantity which is sufficient to improve the storage stability of the poly-ε-caprolactone, that is to say to reduce the ratio $MFI_{stor.}/MFI_{init.}$ and hence to limit the reduction in the inherent viscosity of the poly-ε-caprolactone due to storage.

To be more specific, the quantity of silicon derivative will be generally at least equal to 1 mole per mole of aluminium alkoxide used in the polymerization of ε-caprolactone; in most cases it will be at least equal to 1.5 moles per mole of aluminium alkoxide. Moreover, the quantity of silicon derivative will generally not exceed 30 moles per mole of aluminium alkoxide used in the polymerization of ε-caprolactone; in most cases it will not exceed 15 moles per mole of aluminium alkoxide. Excellent results are obtained by treating the poly-ε-caprolactone with a silicon derivative in a quantity ranging from 2 to 8 moles per mole of aluminium alkoxide used in the polymerization of ε-caprolactone.

The incorporation of the silicon derivative into the poly-ε-caprolactones produced by reactive extrusion generally enables the ratio of the melt indices $MFI_{stor.}/MFI_{init.}$ (as defined above) to be reduced to values lower than 2.5 and even to 2 in the case of the preferred silicon derivatives of the silicon alkoxide type.

The method of incorporation of the silicon derivative into the poly-ε-caprolactone is not critical. The silicon derivative may therefore be incorporated into the poly-ε-caprolactone extracted from the extruder in any suitable mixing device that produces a homogeneous mixture. The silicon derivative is advantageously incorporated into the poly-ε-caprolactone after the actual polymerization in the extruder, but before leaving the extruder. In this case the type and the profile of the extruder screw are chosen so as to permit the feeding of monomer and initiator and the polymerization in a first section of the extruder and the incorporation of the silicon derivative in a second section of the extruder. In the case where the silicon derivative is in the solid state (the case of silicas and inorganic silicates) it is recommended to incorporate the silicon derivative in the form of a master batch. In the case where the silicon derivative is in liquid form, such as, for example, silicon tetraethoxide, it is advantageous to spray it directly onto the poly-ε-caprolactone in the extruder barrel.

The increase in the storage stability of the poly-ε-caprolactones produced with the use of aluminium alkoxides can be improved further when the incorporation of a silicon derivative is preceded by the incorporation of an effective quantity of water.

In accordance with a preferred embodiment of the process according to the invention the incorporation of the silicon derivative into the poly-ε-caprolactone is preceded by the incorporation of an effective quantity of water. In this case the ratios of the melt indices $MFI_{stor.}/MFI_{init.}$ are generally lower than 1.5. The water incorporated into the poly-ε-caprolactone may be in any liquid form that is to say in free or associated form, for example in the form of water of hydration of an inorganic compound which is inert towards the poly-ε-caprolactone. Nevertheless, it is preferred to employ free water and, in particular, demineralized water.

The quantity of water to be used for improving (further) the storage stability of poly-ε-caprolactones may vary within fairly large proportions and is not particularly critical. Generally at least 1×n moles of water will be employed per mole of aluminium alkoxide used as initiator, n denoting the number of alkoxy radicals of the aluminium alkoxide. In most cases at least 1.5×n moles would be employed per mole of aluminium alkoxide. Quantities as high as 200×n moles per mole of aluminium alkoxide used in the polymerization of ε-caprolactone can be employed without disadvantage. Nevertheless, in most cases 100×n moles of water per mole of aluminium alkoxide used as initiator are not exceeded. Excellent results are obtained by incorporating into the poly-ε-caprolactone a quantity of water equivalent to 2×n to 50×n moles per mole of aluminium alkoxide used as initiator in the polymerization of ε-caprolactone.

Just as the silicon derivative, the water is advantageously introduced into the poly-ε-caprolactone after the actual polymerization in the extruder, but before leaving the extruder. It is imperative to incorporate the water before the silicon derivative.

It is to be understood that the poly-ε-caprolactones subjected to the storage stabilization treatment in accordance with the present invention may contain any of the usual ingredients employed in the processing of poly-ε-caprolactones, such as heat stabilizers and antioxidants, which may optionally be incorporated into the monomer at the beginning, or else nucleating agents capable of raising the crystallization temperature. By way of nonlimiting examples of heat stabilizers and of antioxidants which can be employed there may be mentioned products of the substituted phenol type, such as tetrakis[methylene (3,5-di-t-butyl-4-hydroxy)dihydrocinnamate]methane or 4,4'-butylidenebis(6-t-butyl-meta-cresol), and carbodiimides. Nonlimiting examples of effective nucleating agents for poly-ε-caprolactones which may be mentioned are boron nitride and, still more particularly, di-p-ethylbenzylidenesorbitol, which is capable of raising the crystallization temperature of poly-ε-caprolactone from approximately 26–27° C. to approximately 39° C.

The present invention also concerns storage stable poly-ε-caprolactone compositions. These compositions are comprised of poly-ε-caprolactone and an effective quantity of stabilizer derived from silicon.

Preferably, in the storage stable poly-ε-caprolactone compositions of the present invention, the stabilizer derived from silicon is derived from the compounds selected from the group consisting of silicon oxides, inorganic silicates and silicon alkoxides. In another preferred embodiment, in the storage stable poly-ε-caprolactone compositions of the present invention, the stabilizer is derived from a silicon tetraalkoxide in which the identical or different alkyl radicals contain from 1 to 8 carbon atoms. More preferred is that the stabilizer is derived from a silicon tetraalkoxide in which the alkyl radicals are identical and contain from 1 to 4 carbon atoms. In this regard, most preferred is that the silicon tetraalkoxide is silicon tetraethoxide of the formula:

$$Si(O\text{—}CH_2\text{—}CH_3)_4.$$

The examples which follow are intended to illustrate the process of the invention.

Examples 1 to 5 all relate to a poly-ε-caprolactone which has an approximate weight-average molecular mass of 80

000, produced by homopolymerization at 150° C. of ε-caprolactone introduced at a rate of 7 kg/h into an extruder, the polymerization initiator consisting of an equimolar mixture of aluminium tri-sec-butoxide and of methoxyethanol, introduced into the extruder with the aid of a syringe driver at a rate of 14 g/h (that is 0.044 moles Al/h).

The extruder employed for the polymerization is an extruder with two screws rotating in the same direction, the screw profile of which (length: 1050 mm) is arranged so that the first section (from 0 to 616 mm) permits the feeding of monomer and initiator, as well as the complete polymerization, and the second section can be used to introduce the additives and to mix them with the polymer formed at the beginning of the screw. The screw speed is 100 rev/min and the total residence time in the extruder is 120 seconds.

The first section of the extruder (from 0 to 604 mm) includes two zones: a zone for conveying the reactants being polymerized and a second zone (from 604 to 616) in which the screw has a left-handed flight, to slow down the stock before introduction of the additives and to prevent the latter from moving back upstream.

The second section of the extruder includes a first zone for feeding the water and for mixing the latter with the poly-ε-caprolactone (from 616 to 736 mm) and a second zone for feeding the silicon derivative and for mixing the latter with the poly-ε-caprolactone (from 736 to 880 mm) and, lastly, a zone for possible degassing and compression before the die.

In Examples 1 to 4 an ε-caprolactone was used containing the following three usual heat stabilizers and antioxidants for poly-ε-caprolactone:

tetrakis[methylene (3,5-di-t-butyl-4-hydroxy) dihydrocinnamate]methane (stabilizer a) in a proportion of 0.1% by weight;

4,4'-butylidenebis(6-t-butyl-meta-cresol) (stabilizer b) in a proportion of 0.05% by weight;

carbodiimide (stabilizer c) in a proportion of 0.1% by weight.

In Example 5 an ε-caprolactone containing the stabilizers a and b in the abovementioned quantities was used, the stabilizer c being introduced into the poly-ε-caprolactone in a proportion of 0.2% by weight, relative to the ε-caprolactone used, just after the storage stabilization according to the invention and in the form of a master batch based on poly-ε-caprolactone.

In Example 1, given by way of comparison, the poly-ε-caprolactone has not been stabilized for storage.

In Example 2 the poly-ε-caprolactone has been stabilized for storage by continuous introduction, into the second section of the extruder, of silica (sold under the mark Sylobloc CP4 7754) in the form of a master batch with poly-ε-caprolactone in a quantity corresponding to 1% by weight relative to the ε-caprolactone used (that is 26 moles/mole of initiator).

In Example 3 the poly-ε-caprolactone was stabilized for storage by continuous introduction, into the second section of the extruder, of tetraethoxysilicon in a quantity corresponding to 1% by weight relative to the ε-caprolactone used (that is 7.6 moles/mole of initiator).

In Example 4 the poly-ε-caprolactone was stabilized for storage by successive introduction, into the appropriate zones of the extruder, of water in a quantity corresponding to 1.5% by weight relative to the ε-caprolactone used (that is 130 moles/mole of initiator) and of 1% by weight of tetraethoxysilicon relative to the ε-caprolactone used.

In Example 5 the procedure was as in Example 4 except that the stabilizer c was introduced (as already mentioned above) in the form of a master batch directly after the silicon derivative.

Listed in Table I below are the nature and the quantity of the storage stabilizers used according to the process of the invention in poly-ε-caprolactone produced by polymerization of ε-caprolactone melt in an extruder (reactive extrusion) with the use of aluminium trialkoxide.

Comparison of the results of comparative Example 1 with those of Examples 2 and 3 according to the invention shows the appreciable improvement in the storage stability of poly-ε-caprolactones incorporating a silicon derivative.

Comparison of the results of Example 3 with those of Examples 4 and 5 reflects the additional improvement brought about by the preliminary incorporation of water into the poly-ε-caprolactone.

TABLE 1

| Example No. | Stabilizers | | MFI (ASTM D 1238) | | $MFI_{stor.}/MFI_{init.}$ |
|---|---|---|---|---|---|
| | Nature | Quantity %* | $MFI_{stor.}$ | $MFI_{init.}$ | |
| 1 (C) | — | — | 48 | 13 | 3.70 |
| 2 | SiO₂ | 1.0 | 41 | 18 | 2.28 |
| 3 | TEOS** | 1.0 | 30 | 17 | 1.76 |
| 4 | water | 1.5 | | | |
| | TEOS | 1.0 | 19 | 15 | 1.27 |
| 5 | water | 1.5 | | | |
| | TEOS | 1.0 | 13 | 12 | 1.10 |

*% by weight relative to the quantity of ε-caprolactone used in the polymerization
**tetraethoxysilicon

What is claimed is:

1. A process for the storage stabilization of poly-ε-caprolactones produced by continuous polymerization of ε-caprolactone melt in an extruder with the use of aluminum alkoxides as polymerization initiators, comprising incorporating an effective quantity of a silicon tetraalkoxide stabilizer in which the alkoxide alkyl radicals are identical or different $C_{1-8}$ alkyl radicals.

2. The process for storage stabilization of poly-ε-caprolactones according to claim 1, characterized in that the silicon tetraalkoxide is silicon tetraethoxide of formula:

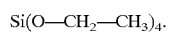

$$Si(O\text{---}CH_2\text{---}CH_3)_4.$$

3. The process for storage stabilization of poly-ε-caprolactones according to claim 1, characterized in that the silicon tetraalkoxide is used in a quantity of at least one mole and not more than 30 moles per mole of aluminium alkoxide used in the polymerization of ε-caprolactone.

4. The process for storage stabilization of poly-ε-caprolactones according to claim 1, characterized in that the silicon tetraalkoxide is incorporated into the poly-ε-caprolactone at the end of polymerization before leaving the extruder.

5. The process for storage stabilization of poly-ε-caprolactones according to claim 1, characterized in that the incorporation of the silicon tetraalkoxide is preceded by the incorporation of an effective quantity of water.

6. The process for storage stabilization of poly-ε-caprolactones according to claim 5, characterized in that the water is incorporated in the form of demineralized free water.

7. The process storage stabilization poly-ε-caprolactone according to claim 6, characterized in that the water is used in a quantity of at least 1×n moles and not more than 200×n moles per mole of aluminium alkoxide used in the polymerization of ε-caprolactone, n denoting the number of alkoxy radicals of the aluminium alkoxide.

8. The process for storage stabilization of poly-ε-caprolactones according to claim 5, characterized in that the water is incorporated in the poly-ε-caprolactone at the end of polymerization before leaving the extruder.

9. A storage stable poly-ε-caprolactone composition comprising poly-ε-caprolactone and an effective quantity of a silicon tetraalkoxide stabilizer in which the alkoxide alkyl radicals are identical or different $C_{1-8}$ alkyl radicals.

10. The storage stable poly-ε-caprolactone composition of claim 9, wherein the silicon tetraalkoxide is silicon tetraethoxide of the formula:

$$Si(O-CH_2-CH_3)_4.$$

11. The process according to claim 1, wherein the poly-ε-caprolactones are selected from the group consisting of homopolymers of ε-caprolactone and copolymers of ε-caprolactone with other lactones comprising β-propiolactone and δ-valerolactone, and mixtures thereof.

12. The composition according to claim 9, wherein the poly-ε-caprolactones are selected from the group consisting of homopolymers of ε-caprolactone and copolymers of ε-caprolactone with other lactones comprising β-propiolactone and δ-valerolactone, and mixtures thereof.

13. The process according to claim 1, wherein the effective quantity is a quantity sufficient to reduce the ratio $MFI_{stor.}/MFI_{ini.}$ of the poly-ε-caprolactone.

14. The composition according to claim 9, wherein the effective quantity is a quantity sufficient to reduce the ratio $MFI_{stor.}/MFI_{ini.}$ of the poly-ε-caprolactone.

* * * * *